United States Patent
Ueno et al.

(10) Patent No.: US 6,710,814 B1
(45) Date of Patent: Mar. 23, 2004

(54) DIGITAL BROADCAST RECEIVING SYSTEM FOR DETECTING SHORT-BREAKS AND HOLDING INFORMATION BASED ON SAME

(75) Inventors: Kohei Ueno, Ichikawa (JP); Akinori Hashimoto, Tokyo (JP); Hisakazu Katoh, Tokyo (JP); Hajime Matsumura, Tokyo (JP); Tomohiro Saito, Tokyo (JP)

(73) Assignees: Sharp Kabushiki Kaisha, Osaka (JP); Nippon Hoso Kyokai, Tokyo (JP)

(*) Notice: Subject to any disclaimer, the term of this patent is extended or adjusted under 35 U.S.C. 154(b) by 0 days.

(21) Appl. No.: 09/555,479

(22) PCT Filed: Aug. 23, 1999

(86) PCT No.: PCT/JP99/04545

§ 371 (c)(1),
(2), (4) Date: Jul. 26, 2000

(87) PCT Pub. No.: WO00/27111

PCT Pub. Date: May 11, 2000

(30) Foreign Application Priority Data

Nov. 4, 1998 (JP) .......................................... 10/313154

(51) Int. Cl.⁷ .............................. H04N 5/04; H04N 7/00
(52) U.S. Cl. .................... 348/500; 348/537; 348/497; 348/553
(58) Field of Search .............................. 348/500, 497, 348/553, 466, 537, 536; 375/324, 326, 327, 371, 375, 376; H04N 5/04, 7/00, 5/44

(56) References Cited

U.S. PATENT DOCUMENTS

| | | | | |
|---|---|---|---|---|
| 4,967,272 A | * | 10/1990 | Kao et al. ................. | 348/386.1 |
| 5,574,509 A | * | 11/1996 | Citta et al. .................. | 348/569 |
| 6,195,393 B1 | * | 2/2001 | Nemiroff et al. ...... | 375/240.28 |
| 6,377,588 B1 | * | 4/2002 | Osaki ......................... | 348/497 |
| 6,400,767 B1 | * | 6/2002 | Nuber et al. ................. | 348/467 |

FOREIGN PATENT DOCUMENTS

| | | |
|---|---|---|
| EP | 0 806 874 A2 | 11/1997 |
| JP | 63-3644 | 1/1988 |
| JP | 64-39813 A | 2/1989 |
| JP | 1-202673 A | 8/1989 |
| JP | 2-57039 A | 2/1990 |
| JP | 5-83238 A | 4/1993 |
| JP | 5-90961 A | 4/1993 |
| JP | 5-336021 A | 12/1993 |
| JP | 08-009190 | 1/1996 |
| JP | 8-149428 A | 6/1996 |
| JP | 8-316999 A | 11/1996 |
| JP | 9-214479 A | 8/1997 |
| JP | 09-312634 | 12/1997 |

OTHER PUBLICATIONS

Supplementary European Search Report.
Microfilm of the specification and drawings annexed to the request of Japanese Utility Model Application No. 97182/1986 (Laid–open No. 3644/1988) (Mitsubishi Electric Corporation), Jan. 1988.

* cited by examiner

Primary Examiner—Sherrie Hsia
(74) Attorney, Agent, or Firm—Nixon & Vanderhye P.C.

(57) ABSTRACT

A receiver is constructed so that it detects a short-break of a digital broadcasting wave by the absence of a synchronizing code or by a transmission control signal multiplexed with the broadcasting wave and, according to the short-break detection signal, holds data and state information (program arrangement, and reference time information) obtained by an antenna and converter (1), tuner and digital decoding portion (2), an error correction code decoding portion (3), a stream multiplexed signal separating portion (4), an audio/video decoding portion (5) and the other components and performs a process for optimally changing characteristics of closed loops for establishing synchronization.

5 Claims, 5 Drawing Sheets

DIGITAL BROADCAST RECEIVING SYSTEM FOR DETECTING SHORT-BREAKS AND HOLDING INFORMATION BASED ON SAME

TECHNICAL FIELD TO WHICH THE INVENTION PERTAINS

The present invention relates to a digital broadcast receiver for receiving a digital broadcasting program via a broadcasting satellite (BS) and, more specifically, to the receiver provided with a control system capable of adaptively controlling the broadcast reception when a short break of a RF-signal occurs due to changing a transmitting station to another at the receiver or due to discontinuity of signal by changing a transmitting system at the transmission station.

BACKGROUND OF THE INVENTION

A short break of a RF-signal can be noticed in advance by using a transmission control signal multiplexed with a digital broadcasting signal via a BS. However, there has been no idea of adaptive control of the receiver to smoothly restoring the broadcast reception against a immediately ceasing short break (wave discontinuity) of a broadcasting signal, which may occur without the notice when a transmission system is changed to another at a broadcast transmitting station. A receiver provided with means for realizing the above-mentioned idea has not yet proposed.

In other words, no proposal has been made in regard to a receiver controlling method that, when a broadcast signal is instantaneously broken (with discontinuity) and immediately restores itself to normal state, can adaptively control the reception of the broadcast by re-synchronizing and presenting video-and-audio signals. A broadcasting wave may suffer attenuation by the effect of some local surrounding conditions such as a heavy rainfall, resulting in decreasing the signal-to-noise ratio of the signal. The short break of a broadcasting signal may take place when, to improve the C/N ratio in such a situation, a viewer at a receiver changes a current received transmitting station to another or an operator at a transmitting station changes a current transmitter to another.

There has not yet been proposed a receiver that has means for discriminating whether a signal is instantaneously broken (it may be restored to normal state after a very short period) or broken (no signal is transmitted for a long time for some reason) and control means adapted to realizing prompt pull-in for re-synchronization and smooth returning presentation of normal video-audio signals after ceasing of the short break.

Once a signal was broken, a conventional receiver, taking no consideration of whether signal can be restored with a short break, detects the out-of-synchronization, stops presentation of an image, mutes the sound output, searches a tunable frequency, retunes and restarts reception of data (e.g., service information in the MPEG2 and the so on). In other words, the receiver performs substantially the same process as it must perform after turning on its power supply.

If it is previously known that the signal will be instantaneously broken and immediately restored to the normal state, the receiver desirably maintains acquired data and state until the broken signal is restored to its normal state. This enables the receiver to promptly restart normal video/audio presentation, i.e., to return to the normal operation.

SUMMARY OF THE INVENTION

Accordingly, a receiver that can detect an instantaneously restorable short-break or discontinuity of a broadcasting signal and perform a specially designated process enabling a viewer to look and listen the video-audio presentation without sensing the actual short-break (discontinuity) of a signal.

In practice with a short-break of a signal, the receiver detects it, keeps in its memory acquired data and receiving conditions until a continuous signal is restored and, then, optimally controls the returning process to promptly restart the normal audio-video presentation. Namely, the present invention has as its primary object the provision of a receiver that can promptly restore the presentation of normally restored signal with a possibly shortest break (discontinuity) that cannot be sensed by the viewer. This receiver can thus solve the problem of the prior art receiver that has to perform a prolonged restart process substantially corresponding to its start process beginning at turning on its power supply.

The receiver detects a break or discontinuity of a received signal and discriminates whether it prolongs or whether it is a short break by a transmission control signal multiplexed with a digital broadcasting wave. According to the discrimination result, the receiver holds tuning data such as a center frequency of a tuner and a frequency offset and controls closed-loop transmission functions of carrier and clock (clock signal) of a phase shift keying (PSK) demodulating portion to obtain a wider pull-in range and a shorter lock-up time. It holds information on an error of phase shift between an internal counter and a program clock reference (PCR) of a digital phase locked loop (PLL), stops updating of information by decoding a video image and presents an immediately preceding image signal. Furthermore, the receiver stops detecting and updating of a presentation time stamp (PTS) and the PCR, changes a jitter range for PCR according to received C/N and controls itself so as to promptly transit to normal operation after a short-break.

The receiver can thus operate to minimize the disordered audio-visual presentation to the viewer due to the discontinuity of the signal during the returning process.

The present invention is provided with the following technical means:

(1) Accordingly, an object of the present invention is to provide a digital broadcast receiving system for receiving a transport stream transmitted according to the MPEG standard and presenting decoded broadcast information comprising: a synchronization detecting means for detecting a synchronizing code in the transport stream; a short-break discriminating means for discriminating whether a transport stream suffers a short-break or not according to synchronizing-code lacking duration determined from the synchronizing-code detection made by the synchronization detecting means; and a returning process control means for performing a process of returning to normal operation after ceasing a short-break of the broadcasting wave by controlling at least one of: means for holding tuning information of a tuner; means for controlling closed-loop transmission functions of carrier and clock of demodulating portion; means for holding phase error information of a digital phase-locked loop (PLL) according to a program clock reference (PCR); means for stopping updating the decoded image presentation and presenting an immediately preceding image signal; means for stopping detecting/updating a presentation time stamp (PTS); and means for stopping detecting/updating the PCR and changing a jitter range for the PCR, wherein the normal operation of the receiving system after ceasing a short-break of the transport stream is restored by driving the returning process control means according to a result of discrimination made by the short-break discriminating means.

(2) Another object of the present invention is to provide a digital broadcast receiving system for receiving a digital broadcasting wave and presenting demodulated broadcasting information comprising: a transmission control signal detecting means for detecting a transmission control code multiplexed with the digital broadcasting wave; a frame synchronization detecting means for detecting a frame synchronizing signal in the digital broadcasting wave; a short-break discriminating means for determining whether the broadcasting wave suffers a short-break or not according to synchronization lacking duration determined from a result of detection made by the short-break discriminating means; a short-break pre-announcing means for giving notice of a short-break of a digital broadcasting wave by a content of the transmission control signal detected by the transmission control signal detecting means; and a returning process control means for performing a process for returning to normal operation after ceasing a short-break of the digital broadcasting wave by controlling at least one of: means for holding tuning information of a tuner; means for controlling closed-loop transmission functions of carrier and clock of a phase-shift keying (PSK) demodulator; means for holding a phase error information of a digital phase-locked loop (PLL) according to a program clock reference (PCR); means for stopping updating the decoded image presentation and presenting an immediately preceding image signal; means for stopping detecting/updating a presentation time stamp (PTS); and means for stopping detecting/updating the PCR and changing a jitter range for the PCR, wherein the normal operation of the receiving system after ceasing a short-break of the broadcasting wave is restored by driving the returning process control means according to a result of discrimination made by the short-break discriminating means or a result of the notice made by the short-break pre-announcing means.

(3) A further object of the present invention is to provide a digital broadcast receiving system for receiving a digital broadcasting wave and presenting demodulated broadcasting information comprising: a transmission control signal detecting means for detecting a transmission control signal multiplexed with the digital broadcasting wave; a closed loop detecting means for detecting a pull-in state of closed loop of a clock or a carrier of a phase-shift keying demodulator; a short-break discriminating means for discriminating whether the broadcasting wave suffers a short-break or not according to a closed-loop's pull-in state and duration detected by the closed loop detecting means; a short-break pre-announcing means for giving notice of a short-break of a digital broadcasting wave by a content of the transmission control signal detected by the transmission control signal detecting means; and a returning process control means for performing a process of returning to normal operation after ceasing a short-break of the digital broadcasting wave by controlling at least one of: means for holding tuning information of a tuner; means for controlling closed-loop transmission functions of carrier and clock of a phase-shift keying (PSK) demodulator; means for holding phase error information of a digital phase-locked loop (PLL) according to a program clock reference (PCR); means for stopping updating the decoded image presentation and presenting an immediately preceding image signal; means for stopping detecting/updating a presentation time stamp (PTS); and means for stopping detecting/updating the PCR and changing a jitter range for the PCR, wherein the normal operation of the receiving system after ceasing a short-break of the broadcasting wave is restored by driving the returning process control means according to a result of discrimination made by the short-break discriminating means or a result of the notice made by the short-break pre-announcing means.

(4) A still further object of the present invention is to provide a digital broadcast receiving system for receiving a digital broadcasting wave and presenting demodulated broadcasting information comprising: a transmission control signal detecting means for detecting a transmission control signal multiplexed with the digital broadcasting wave; a short-break discriminating means for determining whether the broadcasting wave suffers a short-break or not according to logic of the transmission control signal detected by the transmission control signal detecting means; and a returning process control means for performing a process of returning to normal operation after ceasing a short-break of the broadcasting wave by controlling at least one of: means for holding tuning information of a tuner in specified time after the short-break; means for controlling closed-loop transmission functions of carrier and clock of a phase-shift keying (PSK) demodulator; means for holding phase error information of a digital phase-locked loop (PLL) according to a program clock reference (PCR); means for stopping updating the decoded image presentation and presenting an immediately preceding image signal; means for stopping detecting/updating a presentation time stamp (PTS); and means for stopping detecting/updating the PCR and changing a jitter range for the PCR, wherein the normal operation of the receiving system after ceasing a short-break of the broadcasting wave is restored by driving the returning process control means according to a result of discrimination made by the short-break discriminating means.

DESCRIPTION OF PREFERRED
EMBODIMENTS OF THE PRESENT
INVENTION

A digital broadcast receiver according to a preferred embodiment of the present invention will be described bellow with reference to the accompanying drawings.

Figure 1:
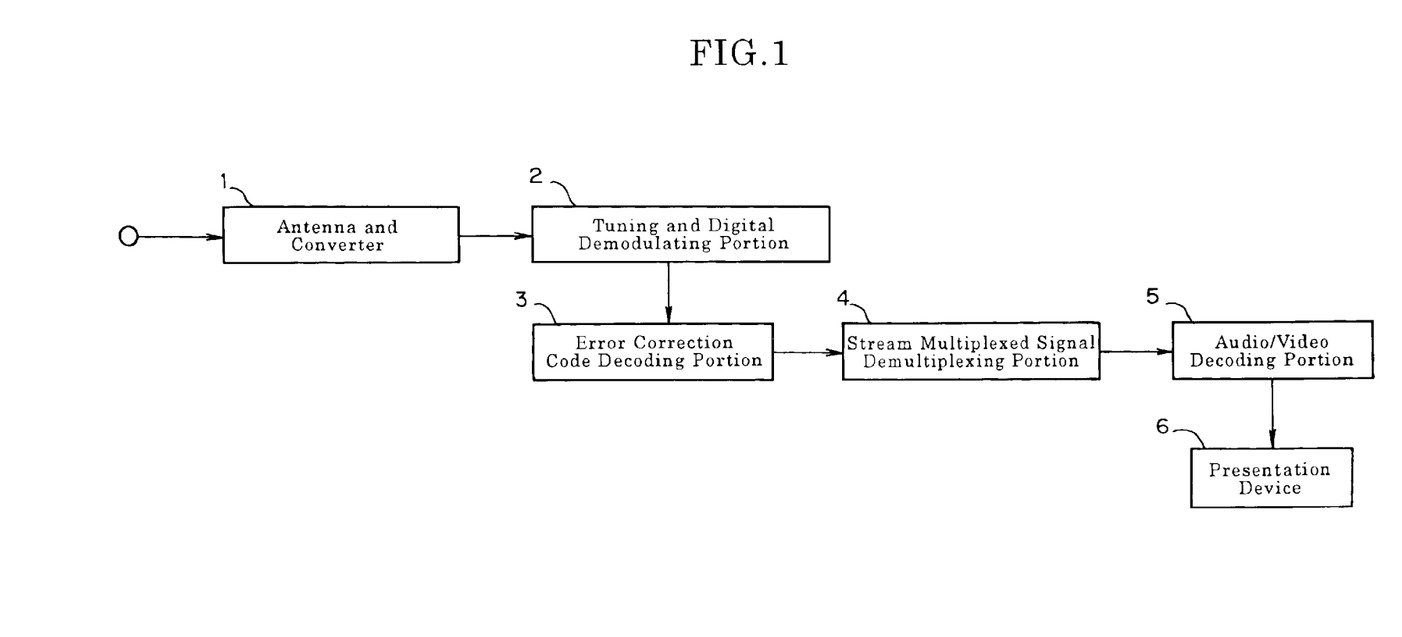
FIG. 1 is a schematic block diagram of a digital broadcasting satellite (BS) receiver according to the present invention.

FIG. 1 illustrates a schematic construction of a digital broadcast receiver embodying the present invention.

Digital compressed audio-visual signals of multiplexed plural broadcasting programs are modulated in phase, upconverted in frequency and then transmitted via a broadcasting satellite to digital broadcast receivers.

The transmitted radio-frequency (RF) signals are received by a digital broadcast receiver through an antenna converter 1 and down-converted to a first intermediate frequency (IF) signal to be input tuning and digital decoding portion 2 of the receiver installed indoor.

At this time, the converter must transform polarization plane of the received wave since the wave from a communication satellite is an orthogonally polarized wave and the wave from a broadcasting satellite is a circularly polarized wave. The tuner must select suitable one of different first intermediate frequencies according to the frequency band arrangement of the received wave.

The tuning and digital demodulating portion 2 tunes the receiver to the receive frequency according to the received signal wave and demodulates the phase-modulated digital signals. For example, the broadcasting via the communication satellite is demodulated according to the QPSK modulation, while the broadcasting via the broadcasting satellite is demodulated according to the 8PSK modulation.

A tuning center frequency of a synthesizer-tuner is externally set to a previously known receive frequency.

The digital demodulating portion (demodulator) is usually provided with a closed loop for locking a received slippage of frequency or a carrier wave and a closed loop for locking a digital-conversion clock at an optimal phase. It has functions for optimizing the demodulation.

The demodulated signal is input to an error correction code decoding portion 3 that in turn decodes a stream encoded by a suitable coding method according to propagation characteristics of different transmission paths (e.g., satellite, earth, cable and so on). The error correction code decoding portion for the communication satellite includes Viterbi decoding, convolutional de-interleaving, transmission de-scrambling, Reed-Solomon decoding and MPEG synchronization code (frame) detection. A main function of this portion is to detect and resolve a sync code (synchronization code) encoded by the error correction coding method and highly protected against a transmission error that may occur specifically on each transmission path.

The error correction code decoding portion for the broadcasting satellite includes Viterbi decoding or Trellis decoding, separation and decoding of a transmission control code, block de-interleaving, transmission descramble, Reed-Solomon decoding and transmission frame synchronization code detection.

The decoded stream having a structure clearly defined after capturing a synchronization code, correcting a transmission path error and decoding transmission path codes is input to a stream multiplexed signal separating portion 4. The input stream contains a large number of multiplexed program arrangement information, time stamps and compressed video-audio signals.

The stream multiplexed signal demultiplexing portion 4 has functions for reading various kinds of multiplexed program-related information (e.g., IDs) from the program-arrangement information, generating a decoding system clock from the time stamps, managing the presentation time and selectively separating a desired program.

A compressed video-audio data stream of a selectively separated program is supplied to an audio/video decoding portion 5. The compressively coded data is based on the MPEG method. The audio/video decoding portion 5 expands the compressed information and outputs decoded data to a presentation device 6 that in turn presents audio-visual presentation.

This is a summary of a structure of the digital broadcast receiver and its operation.

The operation of a receiver according to an aspect of the present invention will be described in detail with reference to the related drawings.

Figure 2:
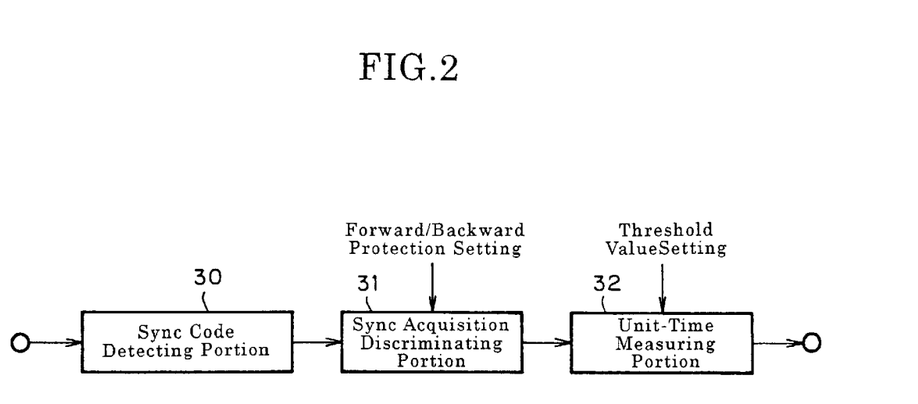
FIG. 2 is a block diagram of a signal short-break detecting system according to an embodiment of the present invention.

FIG. 2 is a block diagram of a short-break detecting portion for detecting a short break of a received signal. The portion shown in FIG. 2 is included in the transmission path code decoding portion of the embodiment shown in FIG. 1.

The circuit of FIG. 2 receives an input of demodulated digital signal tuned to the received frequency corresponding to the received signal wave. A sync code detecting portion 30 separates specified sync codes (47hex) from the decoded signal, defines them as synchronizing-codes by its periodicity (one for every 188 bytes) and detects a sync position (a beginning point of the stream). The sync signal is supplied to a sync-acquisition discriminating portion 31.

The sync-acquisition discriminating portion 31 determines forward protection length and backward protection length and discriminates whether the synchronism is acquired or not by using the above protection lengths. The backward protection discrimination is such that a synchronizing position is determined whereat n sync-signals are detected in succession. The forward protection discrimination is such that the synchronism cannot be acquired (established) if m sync signals are lacking in succession.

A unit time measuring portion 32 considers a short (instantaneous) break of a signal is defined if the time for which the synchronism cannot be acquired is less than a specified threshold. A prolonged break is defined if the above time is equal or grater than the above threshold. Namely, the receiver is designed to perform a special process for a short break less than the threshold and return to a usual restart process if the out-of-sync period exceeds the threshold.

The special process to be performed with a short break thus discriminated will be described in detail bellow.

Figure 3:
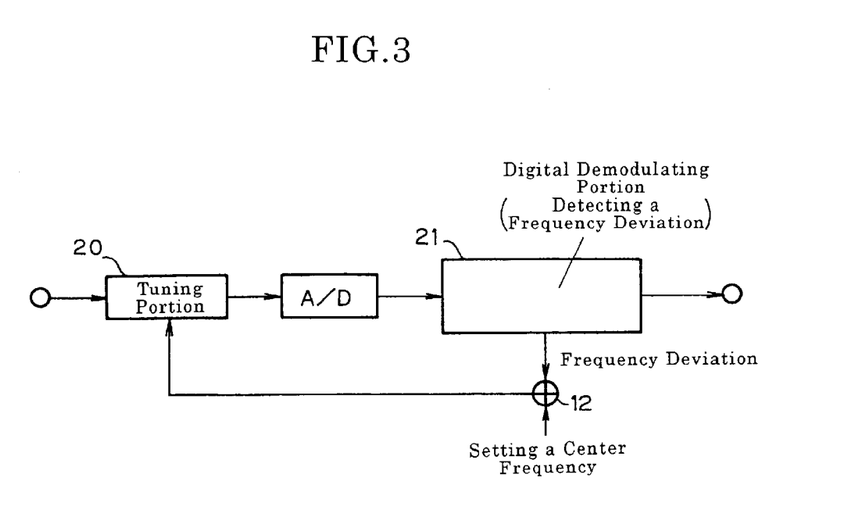
FIG. 3 is a block circuit diagram of a part of a tuning and digital decoding portion, which performs operations necessary for tuning to a receive frequency.

FIG. 3 is a detailed illustration of a part of the tuning and digital decoding portion of FIG. 1.

As shown in FIG. 3, a radio frequency (RF) signal down-converted to a first stage intermediate frequency (IF) is input to a tuning portion 20. In case of demodulating the input signal by using, e.g., a QPSK quasi-synchronous method, a center tuning frequency is set externally, and the input signal is multiplied by a phase-shifted output and a non-phase-shifted output, respectively, of a fixed oscillator to produce detection signals of orthogonal axes IQ.

Then, the signals from the tuning portion 20 are sampled for example at a frequency twice the symbol rate by an A/D converter and demodulated by a digital demodulating portion 21. In the digital demodulating portion 21, a difference between a tuning frequency and a desired receiving frequency (slippage of frequency and polarity) is detected. The previously set center frequency is corrected by adding thereto the frequency difference (error) by an adder 12, thus the tuning frequency is optimally corrected.

In the usual operation, once the acquisition of synchronism became unable, receivable frequencies are searched from the previously received program arrangement information with reference to a table of satellite frequencies and possible causes of the out-of-sync state is examined. In this case, the frequency error data is discarded and, in general, reset-and-restart process is begun.

In the embodiment of the present invention, a frequency error, which corresponds to a slippage between a synchronizing frequency and a desired frequency, is kept for a specified short-break period and used for tuning the a restored signal, shortening the necessary tuning time.

Figure 4:
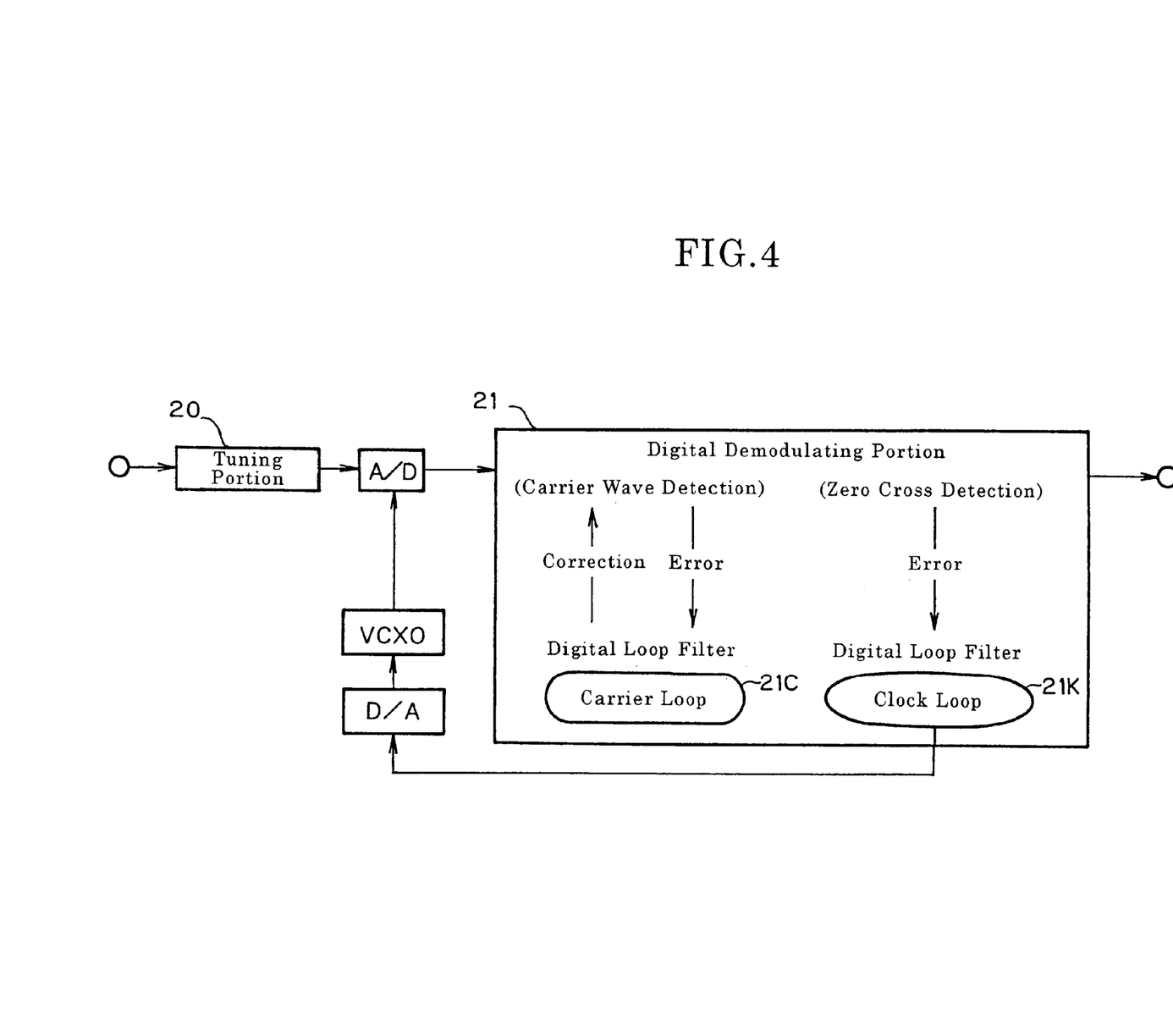
FIG. 4 is a block circuit diagram of a part of a tuning and digital decoding portion, which circuit performs operations for acquiring a carrier and correcting a clock.

FIG. 4 is a detailed illustration of a part of a tuning and digital-decoding portion shown in FIG. 1, which part is intended to capture a carrier and correct a clock.

In FIG. 4, a tuning portion 20 outputs a detection signal of tuned orthogonal axes IQ. This detection signal is converted by the A/D converter into digital signal to be input to a digital demodulating portion 21.

The digital demodulating portion 21 includes a clock closed loop 21K for controlling a sampling clock frequency and a phase for digital conversion and a carrier closed loop 21C for capturing a carrier.

The carrier closed loop 21C is composed of a complex multiplier, a roll-off filter, a frequency phase error detector, a loop filter, a numerically controlled oscillator and a cosine-sine converter.

A carrier wave is input to the complex multiplier wherein phase error data of the carrier frequency is determined by referring to an error conversion table matching a real part, an imaginary part of the carrier wave and its modulation method. The numerically controlled oscillator is then controlled through the loop filter of the secondary closed loop. The oscillator output is converted by the cosine-sine converter into a sine wave signal that is then applied to the complex multiplier to detect again the phase error data of the carrier wave.

A transmission function of each closed loop is changed so that a pull-in time may be optimally shortened when a short-break occurs. Once the carrier was captured, the transmission function is further changed to be suitable to hold the carrier. This enables the receiver to quickly capture the carrier and reliably hold it.

In practice, this control system optimally selects an attenuation-constant and the secondary loop 21$k$, i.e., a ratio of coefficients of a proportional part and an integrating part of the transmission function 21K.

Furthermore, the transmission function of the clock loop is similarly changed to have an optimally shortened pull-in time when a short-break occurs. Once the phase was locked, the transmission function is further changed to be suitable to hold the locked phase. This enables the receiver to quickly lock the loop and reliably hold the locked phase.

The clock loop 21K forms a closed loop that can detect a phase error from data at a zero-crossing sampling point in the digital demodulating portion 21 and normalize the zero-crossing sampling point to be of zero.

Figure 5:
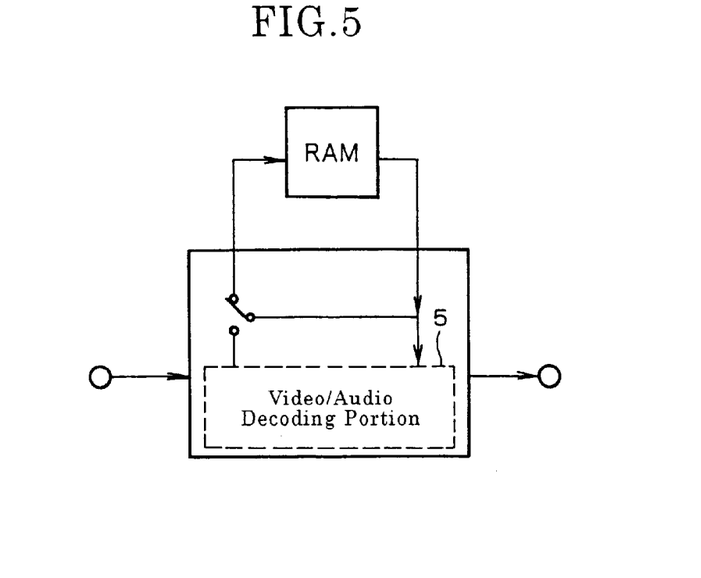
FIG. 5 is a block diagram of a circuit for performing operation for freezing in an image-decoding portion.

FIG. 5 is a block diagram of a circuit for freezing a presentation signal in an image decoder of the audio/video decoding portion 5.

According to FIG. 5, the operation of the circuit is as follows:

When a short break was detected, a random access memory (RAM) for storing data used for a short-break duration is supplied repeatedly with the same image data already stored therein without updating with newly-decoded image, thus realizing continuous presentation of the normal preceding image.

This example is to hold the presentation of a preceding image in place of a shortly broken signal. Alternatively, an image may be muted. Muting an audio signal may be a best countermeasure.

Figure 6:
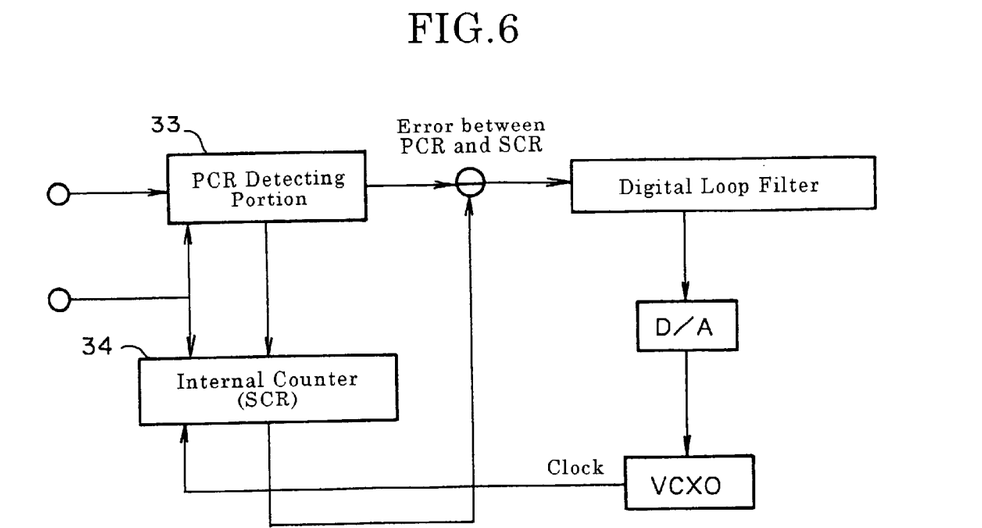
FIG. 6 is a block diagram of a circuit for generating a reference system clock of a program clock reference (PCR).

FIG. 6 is a block diagram of a circuit for generating a reference system clock and time-markers for program clock reference (PCR). This circuit is included in the error correction path code decoding portion of the receiver according to the embodiment of FIG. 1.

As shown in FIG. 6, a transport stream MPEG is input to a terminal of a PCR detecting portion 33. Respective data units are developed according to the header information and flags in the stream. The PCR data serving as a basis of system synchronization is extracted as an output data of the PCR.

The initially extracted PCR data is set on an internal counter 34 (SCR) that starts counting of the same data value. A deference (error) between a value currently extracted by the PCR detecting portion 33 and a count value of the internal counter 34 is input through a digital loop filter to a D-A converter by which it is converted into an analog value. The corresponding voltage is applied as an oscillator control voltage to a voltage controlled crystal oscillator (VCXO) that generates a clock (clock signal) that is used as a reference clock to be counted by the internal counter 34. A closed loop is thus formed.

When a short-break discriminating signal is input to a common terminal, the PCR detecting portion 33 stops redetection of the PCR and the internal counter 34 stops counting.

To prevent erroneous detection of PCR by the PCR detecting portion 34 and erroneous count by the internal counter 34 due to the effect of a short break of a signal, the error value just before the short break is held for causing the oscillator to generate a fixed value. When a normal signal is restored, the above-mentioned initial process is restarted, thereby the closed loop stably restart the operation, realizing the immediate pull-in state.

Figure 7:
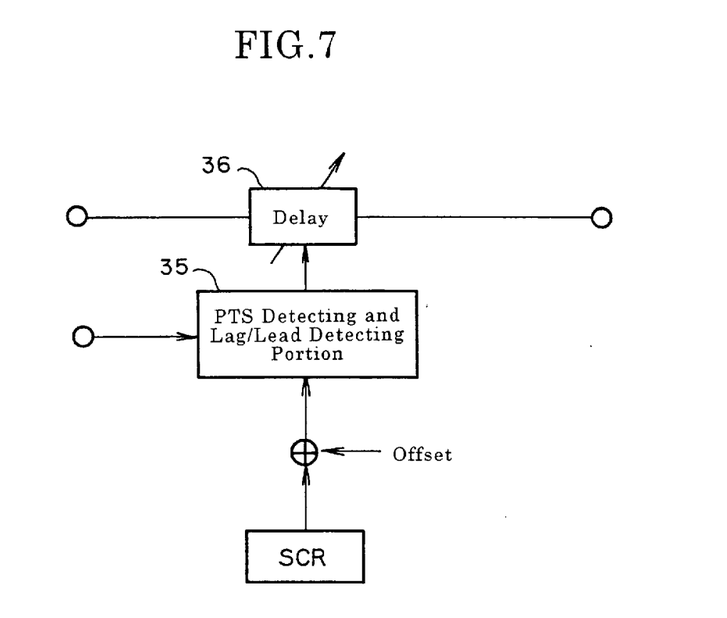
FIG. 7 is block diagram of a circuit for performing the control of presentation by a presentation time stamp (PTS).

FIG. 7 is a block diagram of a circuit for performing the control of presentation according to a presentation time stamp (PTS). The circuit shown in FIG. 7 is included in the audio/video decoding portion of the receiver according to the embodiment shown in FIG. 1.

Presentation-related information (e.g., the PTS indicating a relative presentation time multiplexed with image information) is separated and extracted by a PTS detecting and lag/lead detecting portion 35.

A lag/lead is detected by determining a difference from an internal reference time (offsetting is possible) of the internal counter (SCR) and the presentation time is adjusted by a delay 36. With a short break of a signal, the image information is not newly decoded since a new input stream is not correct and the internal counter (SCR) stops counting. Detection of a new PTS is continued but data is not updated. The delay therefore becomes constant. Consequently, presentation of a just preceding image can be stably repeated.

The receiver having the above structure can smoothly restore its normal and stable operation.

Alternative method for detecting a short-break of an input signal in another embodiment of the present invention will be described below. (The practical control with a short break is similar to that of the preceding embodiment.)

Figure 8:
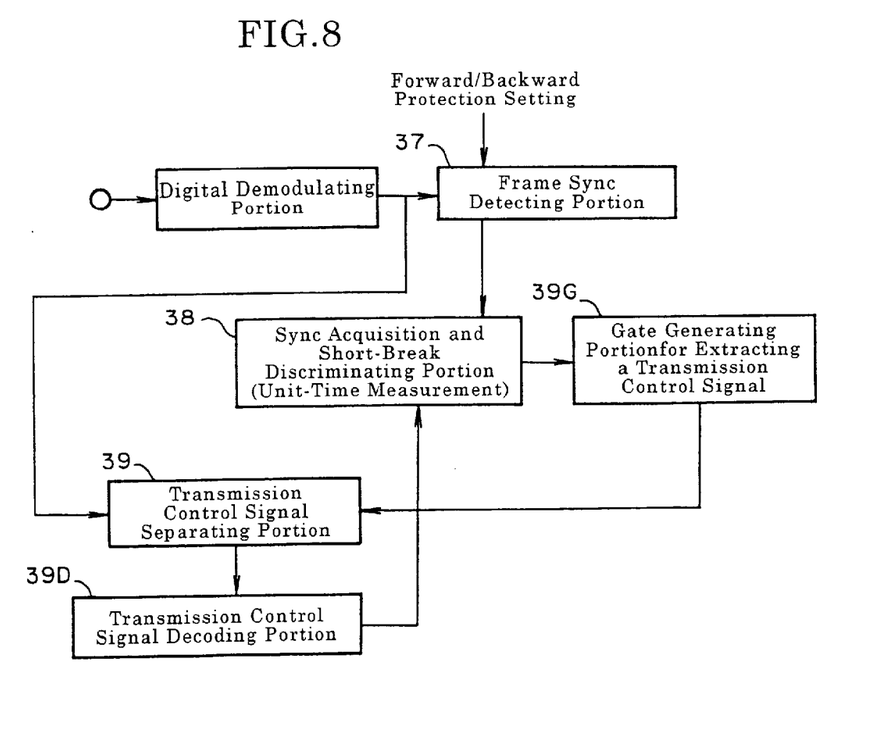
FIG. 8 is a block diagram of a short-break detection circuit of an embodiment of the present invention.

FIG. 8 is a block diagram of a short-break detection circuit according to an embodiment of the present invention. The circuit shown in FIG. 8 is contained in the transmission-line-code decoding portion of the embodiment of FIG. 1.

As shown in FIG. 8, digital data demodulated by a digital demodulating portion is input to a frame sync detecting portion 37.

For example, a frame synchronizing signal multiplexed with data to be transmitted by a broadcasting satellite is a known fixed code that is inserted at specified intervals. The specificity and periodicity of the synchronizing code is used for detection of the frame synchronization.

The frame synchronization (sync) detecting portion 37 determines forward protection length and backward protection length, discriminates whether the synchronism is acquired on one side and the synchronization is not acquired on the other side if the conditions are satisfied. For example, the backward protection determines the acquisition of the synchronization (synchronized position) if n pieces of sync signals are detected in succession while the forward protection determines the impossibility of acquiring the synchronization if m pieces of sync signals lack in succession.

The synchronizing signal from the synchronization detecting portion 37 is input to the synchronization acquisition and short-break discriminating portion 38, by which a break of a received signal is discriminated as a short break if the time of inability to acquire the synchronization did not exceed a specified threshold period and it is discriminated as a prolonged break if inability to acquire the synchronization exceeded a specified threshold period.

Namely, the portion determines the occurrence of a short-break being shorter than the threshold period and causes the system to carry out the special process for that period or determines the occurrence of the prolonged break over the threshold period and begins the usual restart process. Furthermore, a gate generating portion 39G generates a gate signal to be used for extracting a transmission control signal from the reference frame synchronizing signal multiplexed with the broadcasting wave. The transmission control signal separating portion 39 separates the transmission signal by using the above gate signal.

The extracted transmission control signal decoding portion conducts error correction and decoding of the transmission control signal according to the transmission system and then extracts a short-break notifying code. This notice code is a signal used, for example, as an advance notice of site diversity. In this instance, this signal can previously notify a short break of several microseconds.

The notifying signal is input to the sync acquisition and short break discriminating portion (unit time Measurement) 38 that decides the occurrence of a short break by a signal from the unit time counter or the notifying signal. In this instance, it is also possible to speed up the detection of the sync signal acquisition by setting a backward protection length of frame sync detection portion 37 shorter than a usual value just after detecting a short-break.

Another short-break detection technique according to another embodiment of the present invention will be described below.

This technique is to discriminate a short break of the broadcasting wave by using the above described notifying code or a discrimination signal obtained by comparing an error signal of a digital demodulating portion 21 of FIG. 4 with a preset threshold value.

In the latter case, detection process is to detect whether an error signal of a carrier loop or an error signal of a clock loop exceeds a certain threshold or not, binarizes the result to form a logical signal and then measure logical signals formed for a unit duration. A short break is discriminated based on the count result.

In case of a short break of the broadcasting wave, the receiver may uses a special processing including changing a jitter range of PCR and SCR, which is one of means for optimal control of the entire system.

Usually, when the jitters exceeds the jitter range, the processing is performed to decrease jitter within the jitter range by repeating or skipping a B-frame. If the jitter falls within the range, an internal delay is used to match two data units with each other.

If a short break is detected by occasional lacking of a PCR in spite of its continuity (SCR and PCR being the same) before and after the short break, it is possible to quickly restore a non-jitter state by setting the jitter range narrower than usual range and changing the range for a frame skipping or repeating unit.

For the receiver, storing previously obtained program arrangement information and a viewer's history is an essential condition for carrying out the above-described operation.

Another short-break detection technique according to another embodiment of the present invention will be described below.

The short break may be discriminated by referring to information transmitted from the transmission station, which information indicates a change of an up-linking station (advance notice of site diversity) included in a transmission control signal multiplexed with a digital satellite broadcasting wave.

Having detected a short-break notice included in the transmission control signal, the receiver begins the holding process against the short break that will arise after the elapse of a certain time.

In practice, as shown in FIG. 8, the receiver separates a transmission control signal by a transmission-control signal separating portion 39, decodes the above short break information by a transmission control signal decoding portion 39D and discriminates whether the break is instantaneous or not. If so, the receiver starts the adaptive control of the broadcasting wave reception after a certain time elapsed.

As described above, when the discontinuity of a signal is detected by a receiver and a stream having close continuation to the stream before a short break is restored with an elapse of very short time, it is desirable for the receiver to hold the almost data obtained and keep the continuity of its state before and after the short break.

INDUSTRIAL APPLICABILITY

As described above, the present invention enables a receiver to operate the continuity of its operation in the event of a short break of a received signal and therefore to quickly restore the audio-visual presentation, i.e., restore its normal working state in restarting the received signal. When an instantaneous break (the discontinuity) of a signal stream is irrevocably caused by switching a transmitter to another at a transmission station, a user can continuously view the presentation without sensing its discontinuity at the receiver. In other words, the receiver can minimize the affection of instantaneous break of the broadcasting transmission service.

The present invention can provide a receiver for receiving a transport stream according to MPEG standards, which can effectively discriminate a short break based on a time for which a sync code (synchronizing code) is missing in the transport stream.

The present invention can also provide a receiver for receiving a digital broadcasting wave (including a transmission control signal multiplexed therewith), which can effectively discriminate a short break based on a time for which a frame sync signal is missing or a previous notice of a short break, which notice is contained in a transmission control signal.

The present invention can further provide a receiver for receiving a digital broadcasting wave (including a transmission control signal multiplexed therewith), which can effectively discriminate a short break according to a pull-in state and a pull-in time of closed loop of a carrier or a clock of a PSK demodulating portion or a previous notice of a short-break, which notice is contained in a transmission control signal.

The present invention can still further provide a receiver for receiving a digital broadcasting wave (including a transmission control signal multiplexed therewith), which can effectively discriminate a short break according to a logic of a transmission control signal.

What is claimed is:

1. A digital broadcast receiving system for receiving a transport stream transmitted according to the MPEG standard and presenting decoded broadcast information comprising:

a synchronization detecting means for detecting a synchronizing-code in the transport stream;

a short-break discriminating means for determining whether a transport stream suffers a short-break or a prolonged break according to synchronizing-code lacking duration determined from the synchronizing-code detection made by the synchronization detecting means, so that when a time that adequate reception of the synchronizing code exceeds a predetermined threshold it is determined that the transport stream suffers the prolonged break, but when a time that adequate reception of the synchronizing code does not exceed the predetermined threshold it is determined that the transport stream suffers the short break; and a returning process control means for performing a restart process when a prolonged break is determined, but performing a process of returning to normal operation after ceasing of a determined short-break of a broadcasting wave by controlling at least one of:

means for holding tuning information of a tuner;

means for controlling closed-loop transmission functions of carrier and clock of demodulating portion;

means for holding phase error information of a digital phase-locked loop (PLL) according to a program clock reference (PCR);

means for stopping updating a decoded image presentation and presenting an immediately preceding image signal;

means for stopping detecting/updating a presentation time stamp (PTS); and means for stopping detecting/updating the PCR and changing a jitter range for the PCR, wherein the normal operation of the receiving system after ceasing a short-break of the transport stream is restored by driving the returning process control means according to a result of discrimination made by the short-break discriminating means.

2. A digital broadcast receiving system for receiving a digital broadcasting wave and presenting demodulated broadcasting information comprising:

a transmission control signal detecting means for detecting a transmission control code multiplexed with the digital broadcasting wave;

a frame synchronization detecting means for detecting a frame synchronizing signal in the digital broadcasting wave;

a short-break discriminating means for determining whether the broadcasting wave suffers a short-break or not according to synchronization lacking duration determined from a result of detection made by the short-break discriminating means; a short-break pre-announcing means for giving notice of a short-break of a digital broadcasting wave by a content of the transmission control signal detected by the transmission control signal detecting means; and a returning process control means for performing a process for returning to normal operation after ceasing a short-break of the digital broadcasting wave by controlling at least one of:

means for holding tuning information of a tuner;

means for controlling closed-loop transmission functions of carrier and clock of a phase-shift keying (PSK) demodulator;

means for holding a phase error information of a digital phase-locked loop (PLL) according to a program clock reference (PCR);

means for stopping updating a decoded image presentation and presenting an immediately preceding image signal;

means for stopping detecting/updating a presentation time stamp (PTS); and means for stopping detecting/updating the PCR and changing a jitter range for the PCR, wherein the normal operation of the receiving system after ceasing a short-break of the broadcasting wave is restored by driving the returning process control means according to a result of discrimination made by the short-break discriminating means or a result of the notice made by the short-break pre-announcing means.

3. A digital broadcast receiving system for receiving a digital broadcasting wave and presenting demodulated broadcasting information comprising:

a transmission control signal detecting means for detecting a transmission control signal multiplexed with the digital broadcasting wave;

a closed loop detecting means for detecting a pull-in state of closed loop of a clock or a carrier of a phase-shift keying demodulator;

a short-break discriminating means for discriminating whether the broadcasting wave suffers a short-break or not according to a closed-loop's pull-in state and duration detected by the closed loop detecting means;

a short-break pre-announcing means for giving notice of a short-break of a digital broadcasting wave by a content of the transmission control signal detected by the transmission control signal detecting means; and a returning process control means for performing a process of returning to normal operation after ceasing a short-break of the digital broadcasting wave by controlling at least one of:

means for holding tuning information of a tuner;

means for controlling closed-loop transmission functions of carrier and clock of a phase-shift keying (PSK) demodulator;

means for holding phase error information of a digital phase-locked loop (PLL) according to a program clock reference (PCR);

means for stopping updating a decoded image presentation and presenting an immediately preceding image signal;

means for stopping detecting/updating a presentation time stamp (PTS); and means for stopping detecting/updating the PCR and changing a jitter range for the PCR, wherein the normal operation of the receiving system after ceasing a short-break of the broadcasting wave is restored by driving the returning process control means according to a result of discrimination made by the short-break discriminating means or a result of the notice made by the short-break pre-announcing means.

4. A digital broadcast receiving system for receiving a digital broadcasting wave and presenting demodulated broadcasting information comprising:

a transmission control signal detecting means for detecting a transmission control signal multiplexed with the digital broadcasting wave;

a short-break discriminating means for determining whether the broadcasting wave suffers a short-break or a prolonged break according to logic of the transmission control signal detected by the transmission control signal detecting means; and a returning process control means for performing a first process in response to a determined prolonged break, and performing a different second process of returning to normal operation after ceasing of a determined short-break of the broadcasting wave by controlling at least one of:

means for holding tuning information of a tuner in specified time after the short-break;

means for controlling closed-loop transmission functions of carrier and clock of a phase-shift keying (PSK) demodulator;

means for holding phase error information of a digital phase-locked loop (PLL) according to a program clock reference (PCR);

means for stopping updating a decoded image presentation and presenting an immediately preceding image signal;

means for stopping detecting/updating a presentation time stamp (PTS); and  means for stopping detecting/updating the PCR and changing a jitter range for the PCR,  wherein the normal operation of the receiving system after ceasing a short-break of the broadcasting wave is restored by driving the returning process control means according to a result of discrimination made by the short-break discriminating means.

5. A digital broadcast receiving method for receiving a transport stream transmitted according to the MPEG standard and presenting decoded broadcast information comprising:

a synchronization detector for detecting a synchronizing-code in the transport stream;

a short-break discriminator for discriminating whether a transport stream suffers a short-break or a prolonged break according to synchronizing-code lacking duration determined from the synchronizing-code detection made by the synchronization detector; and  a controller(s) performing a first process in response to a determined prolonged break, and performing a different second process of returning to normal operation after ceasing of a determined short-break of a broadcasting wave by controlling at least one of:

holding tuning information of a tuner;

controlling closed-loop transmission functions of carrier and clock of demodulating portion;

holding phase error information of a digital phase-locked loop (PLL) according to a program clock reference (PCR);

stopping updating a decoded image presentation and presenting an immediately preceding image signal;

stopping detecting/updating a presentation time stamp (PTS); and stopping detecting/updating the PCR and changing a jitter range for the PCR,  wherein the normal operation after ceasing a short-break of the transport stream is restored by driving the a returning process controller according to a result of discrimination made by the short-break discriminator.

\* \* \* \* \*